United States Patent
Ep Hakim et al.

(10) Patent No.: US 12,294,762 B1
(45) Date of Patent: May 6, 2025

(54) SYSTEMS AND METHODS FOR INSERTING CONTENT INTO VIDEOS

(71) Applicant: GoPro, Inc., San Mateo, CA (US)

(72) Inventors: Rawia Mhiri Ep Hakim, San Mateo, CA (US); Guillaume Abbe, Paris (FR); Jean-Baptiste Noël, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 387 days.

(21) Appl. No.: 17/859,846

(22) Filed: Jul. 7, 2022

(51) Int. Cl.
*H04N 21/44* (2011.01)
*G06T 7/70* (2017.01)

(52) U.S. Cl.
CPC ......... *H04N 21/44016* (2013.01); *G06T 7/70* (2017.01); *G06T 2207/10016* (2013.01); *G06T 2207/30241* (2013.01)

(58) Field of Classification Search
CPC ................ H04N 21/44016; G06T 7/70; G06T 2207/10016; G06T 2207/30241
See application file for complete search history.

(56) References Cited

PUBLICATIONS

Tarko, Real-time Virtual Object Insertion for Moving 360° Videos, The 17th International Conference on Virtual-Reality Continuum and its Applications in Industry (VRCAI '19) (Year: 2019).*
Kurz, Handheld Augmented Reality involving gravity measurements, Computers & Graphics 36 (2012) 866-883 (Year: 2012).*
Ahir, Occlusion in Augmented Reality, Medium, May 27, 2020 (Year: 2020).*
Felixgeen, build virtual camera path based on original camera positions, NVlabs/instant-ngp • Discussion #506 • GitHub, https://github.com/NVlabs/instant-ngp/discussions/506, Apr. 20, 2022 (Year: 2022).*

* cited by examiner

*Primary Examiner* — Vu Le
*Assistant Examiner* — Lei Zhao
(74) *Attorney, Agent, or Firm* — Esplin & Associates, PC

(57) ABSTRACT

A video and an object to be inserted into visual content of the video may be obtained. Trajectory of an image capture device during capture of the video may be used to determine placement of the object within the visual content. The visual content may be modified to include the object based on the placement of the object.

20 Claims, 5 Drawing Sheets

402

404

406

SYSTEMS AND METHODS FOR INSERTING CONTENT INTO VIDEOS

FIELD

This disclosure relates to inserting content into a video using trajectory of an image capture device that captured the video.

BACKGROUND

A user may wish to insert content (e.g., text, image) into a video. For example, a user may wish to insert augmented reality content into a video to intermix virtual and real-world objects in the video. Controlling how and where the content is inserted into the video may be difficult and time consuming.

SUMMARY

This disclosure relates to inserting content into videos. Video information, trajectory information, object information, and/or other information may be obtained. The video information may define a video having a progress length. The video may include visual content having a field of view. The trajectory information may characterize trajectory of an image capture device during capture of the video. The object information may define an object to be inserted into the visual content. Placement of the object within the field of view of the visual content may be determined based on the trajectory of the image capture device during the capture of the video and/or other information. The visual content may be modified to include the object based on the placement of the object within the field of view of the visual content and/or other information.

A system for inserting content into videos may include one or more electronic storage, processor, and/or other components. The electronic storage may store video information, information relating to a video, information relating to visual content, information relating to a field of view of the visual content, trajectory information, information relating to trajectory of an image capture device during capture of the video, object information, information relating to an object to be inserted into the visual content, information relating to placement of the object, information relating to modification of the visual content, and/or other information.

The processor(s) may be configured by machine-readable instructions. Executing the machine-readable instructions may cause the processor(s) to facilitate inserting content into videos. The machine-readable instructions may include one or more computer program components. The computer program components may include one or more of a video component, a trajectory component, an object component, a placement component, a modification component, and/or other computer program components.

The video component may be configured to obtain video information and/or other information. The video information may define a video having a progress length. The video may include visual content having a field of view.

The trajectory component may be configured to obtain trajectory information and/or other information. The trajectory information may characterize trajectory of an image capture device during capture of the video.

In some implementations, the trajectory of the image capture device during the capture of the video may include translational position and/or rotational position of the image capture device during the capture of the video.

The object component may be configured to obtain object information and/or other information. The object information may define one or more objects to be inserted into the visual content. In some implementations, the object(s) may include a visual representation of the trajectory of the image capture device during the capture of the video.

The placement component may be configured to determine placement of the object(s) within the field of view of the visual content. The placement of the object(s) within the field of view of the visual content may be determined based on the trajectory of the image capture device during the capture of the video and/or other information.

In some implementations, determination of the placement of the object(s) within the field of view of the visual content may include determination of relative position of the object(s) with respect to position of a virtual image capture device that represent the image capture device.

In some implementations, the placement of the object(s) within the field of view of the visual content be defined by position, rotation, and size of the object(s) within the field of view of the visual content. In some implementations, the placement of the object(s) may be determined to align the object(s) with a direction of gravity on the image capture device during the capture of the video.

In some implementations, the placement of the object(s) within the field of view of the visual content may determine distortion that is applied to the object(s) for inclusion in the visual content.

The modification component may be configured to modify the visual content. The visual content may be modified to include the object(s) based on the placement of the object(s) within the field of view of the visual content and/or other information.

In some implementations, the visual content may be modified to include the object(s) over existing visual content. In some implementations, the visual content may be modified to include existing visual content over at least a portion of the object(s).

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
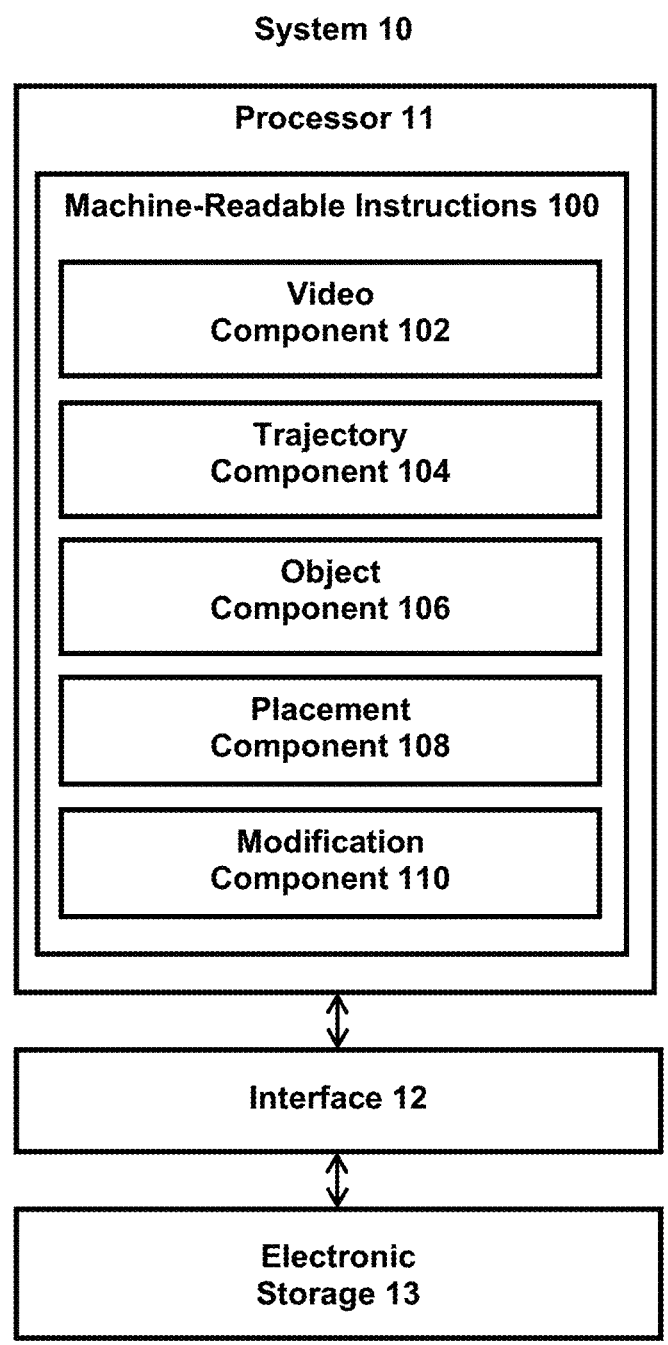
FIG. 1 illustrates an example system for inserting content into videos.

FIG. 1 illustrates a system 10 for inserting content into videos. The system 10 may include one or more of a processor 11, an interface 12 (e.g., bus, wireless interface), an electronic storage 13, and/or other components. Video information, trajectory information, object information, and/or other information may be obtained by the processor 11. The video information may define a video having a progress length. The video may include visual content having a field of view. The trajectory information may characterize trajectory of an image capture device during capture of the video. The object information may define an object to be inserted into the visual content. Placement of the object within the field of view of the visual content may be determined by the processor 11 based on the trajectory of the image capture device during the capture of the video and/or other information. The visual content may be modified by the processor 11 to include the object based on the placement of the object within the field of view of the visual content and/or other information.

Inserting content, such as an object, into a video requires positions over time of the image capture device (6 degrees of freedom: 3 for changes in translation along three perpendicular axes, 3 for changes in orientation through rotation about three perpendicular axes). The positions may be determined (e.g., by the image capture device at the time of video capture or by other computing device after video capture) such as via use of IMU data, GPS data, frame analysis, and/or a combination of different analysis. Also required is optical projection information (e.g., lens distortion, zoom) of the image capture device. This information may be stored/associated with the video. Optical projection of the image capture device may be static or dynamic during the capture of the video. The scale/size of the content may also be changed. It may be difficult and time-consuming for a user to control parameters for different degrees of freedom to insert content into the video.

The present disclosure simplifies the setting of the degrees of freedom for the user by using the trajectory of the image capture device to control insertion of content into videos. For example, an object may be inserted on the trajectory at a particular moment (e.g., time) in the video, requiring one input of the moment identification from the user. The object may be inserted in the field of view of the image capture device at a particular moment in the video, requiring one input of the moment identification from the user. The distance and scale of the object may be automatically determined based on the trajectory of the image capture device and/or the geometry of the scene. Thus, the object is easily inserted in the video via use of the field of view at the moment (time) selected by the user. In some implementations, more granular controls may be provided to the user to expand the degrees of freedom controllable by the user. For example, options may be provided for a user to (1) determine whether the object should be aligned with the direction of gravity, (2) change the distance of the object from the trajectory of the image capture device, (3) change the scale/size of the object, and/or (4) adjust translational and/or rotational position of the object.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, information relating to visual content, information relating to a field of view of the visual content, trajectory information, information relating to trajectory of an image capture device during capture of the video, object information, information relating to an object to be inserted into the visual content, information relating to placement of the object, information relating to modification of the visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate inserting content into videos. The machine-readable instructions 100 may include one or more computer program components. The machine-readable instructions 100 may include one or more of a video component 102, a trajectory component 104, an object component 106, a placement component 108, a modification component 110, and/or other computer program components.

The video component 102 may be configured to obtain video information and/or other information. Obtaining video information may include one or more of accessing, acquiring, analyzing, capturing, determining, examining, generating, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of an image capture device, electronic storage of information and/or signals generated by one or more sensors, electronic storage of a device accessible via a network, and/or other locations. The video component 102 may obtain video information from one or more hardware components (e.g., an image sensor, a communication device) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to edit videos (e.g., insert an object into a video). The video information for a video may be obtained based on the user's selection of the video through the user interface/video application. Other selections of a video for retrieval of video information are contemplated.

The video information may define a video. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers are contemplated.

The video may be captured by an image capture device. An image capture device may refer to a device captures visual content. An image capture device may capture visual content in form of images, videos, and/or other forms. An image capture device may refer to a device for recording visual information in the form of images, videos, and/or other media. An image capture device may capture other content, such as audio content. The video may include visual content having a field of view. The video may include other video content, such as audio content. An image capture device may be a standalone device (e.g., camera, action camera, image sensor) or may be part of another device (e.g., part of a smartphone, tablet).

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The video information may define the video by including information that defines one or more content, qualities, attributes, features, and/or other aspects of the video. For example, video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. For example, the video information may include information that makes up and/or is used to determine pixels of video frames of the video. Other types of video information are contemplated.

The trajectory component 104 may be configured to obtain trajectory information and/or other information. Obtaining trajectory information may include one or more of accessing, acquiring, analyzing, capturing, determining, examining, generating, identifying, loading, locating, opening, receiving, retrieving, reviewing, selecting, storing, and/or otherwise obtaining the trajectory information. The trajectory component 104 may obtain trajectory information from one or more locations. For example, the trajectory component 104 may obtain trajectory information from a storage location, such as the electronic storage 13, electronic storage of an image capture device, electronic storage of information and/or signals generated by one or more sensors, electronic storage of a device accessible via a network, and/or other locations. The trajectory component 104 may obtain trajectory information from one or more hardware components (e.g., a position sensor, a communication device) and/or one or more software components (e.g., software running on a computing device).

The trajectory information may characterize trajectory of an image capture device during capture of the video. The trajectory information may characterize the trajectory of the image capture device during capture of the video by describing, defining, and/or otherwise characterizing the trajectory of the image capture device during capture of the video. The trajectory of the image capture device may refer to one or more paths and/or progression of positions followed/experienced by the image capture device/housing during the capture duration. The trajectory may reflect positions of the image capture device at different moments within the capture duration. In some implementations, the trajectory of the image capture device during the capture of the video may include translational position and/or rotational position of the image capture device during the capture of the video. The trajectory of the image capture device may include how the image capture device moved through space and how the image capture device was oriented (e.g., with respect to ground) during the capture of the video.

In some implementations, the trajectory may reflect stabilized positions of the image capture device. Movement of the image capture device during the capture of the video may cause undesired movements in the video, such as shakes and/or jitters. The video may be stabilized to provide a more stable (e.g., less shaky, less jitters) video. The stabilized positions of the image capture device may include the positions of the image capture device (e.g., actual positions of the image capture device, virtual positions to create a more stable trajectory) that are used to stabilize the video.

In some implementations, the trajectory information may be obtained based on analysis of the video. For example, the trajectory of the image capture device during the capture duration may be determined based on analysis of the visual content within the video. Analysis of the visual content may include examination, processing, studying, classification, and/or other analysis of the visual content. For example, the trajectory of the image capture device may be reconstructed in three-dimensional space using Structure from Motion and/or other visual analysis techniques. Analysis of the visual content may be used to determine positions of objects captured within the visual content.

In some implementations, the trajectory information may be obtained based on analysis of position sensor information. A position sensor may refer to a sensor that that measures experienced positions and/or motions. The position sensor may convert experienced positions and/or motions into output signals. The output signals may include electrical signals. For example, a position sensor may include one or more inertial measurement units (IMUs), one or more accelerometers, one or more gyroscopes, one or more magnetometers, one or more Global Positioning System (GPS) sensors, and/or other position sensor. The position sensor may generate output signals conveying information that characterizes positions and/or motions of the position sensor and/or device(s) carrying the position sensor, such as the image capture device.

For example, the position sensor may be configured to generate a position output signal based on positions of the image capture device during the capture duration. The position output signal may convey position information that characterizes positions of the image capture device at different moments (points in time, time durations) within the capture duration. The position information may characterize positions of the image capture device based on specific translational and/or rotational positions of the image capture device and/or based on changes in translational and/or rotational positions of the image capture device as a function of progress through the capture duration. That is, the position information may characterize translational and/or rotational positions of the image capture device and/or changes in translational and/or rotational positions (motion) of the image capture device (e.g., direction, amount, velocity, acceleration) during the capture duration.

In some implementations, the position information may include data from the position sensor (e.g., gyroscope data, accelerometer data) with time stamps per visual content capture at different moments. For example, the position may include gyroscope data and/or accelerometer data per individual video frames captured by the image capture device. In some implementations, calibration of an inertial measurement unit may be used to combine different data within the position information.

The trajectory of the image capture device during the capture duration may be determined based on analysis of the position information. Information from the position sensor(s) may be analyzed to determine how the image capture device was positioned/moved during the capture duration. Information from the position sensor(s) may be analyzed to determine motion of the image capture device along one or more degrees of freedom for the image capture device. Position information may include information on direction of gravity (gravity vector) on the image capture device, which may be used to determine which the image capture device was oriented.

In some implementations, the trajectory information may be obtained based on analysis of the visual content, the position information, and/or other information. Analysis of the visual content may be combined with analysis of the position information to determine the trajectory of the image capture device during the capture duration. For example, Structure from Motion may be used to determine the shape of the trajectory (e.g., whether the image capture device moved in a straight line, whether the trajectory includes a curve or a corner), while the information from the GPS sensor may be used to determine the measurement dimension of the trajectory (e.g., whether the image capture device moved centimeter(s), meter(s), kilometer(s)).

Figure 3:
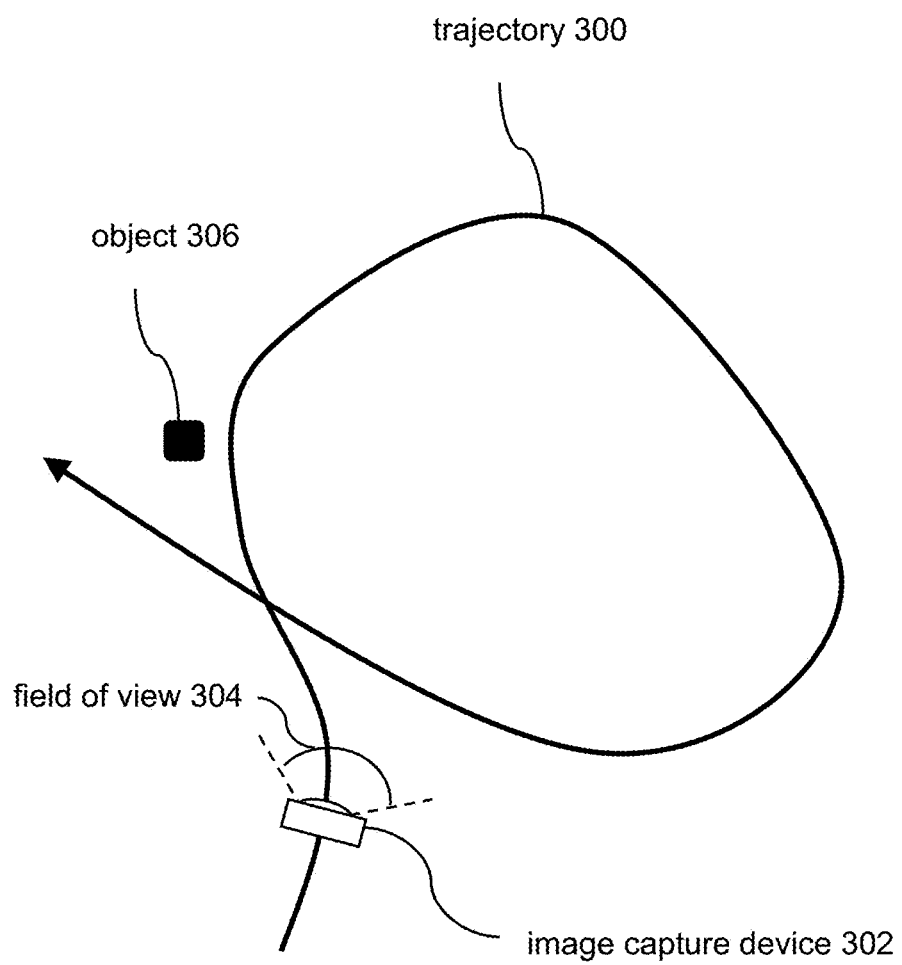
FIG. 3 illustrates an example trajectory of an image capture device.

FIG. 3 illustrates an example trajectory 300 of an image capture device 302. The image capture device 302 may have moved along the trajectory 300 while capturing a video. The image capture device may have a field of view 304. In FIG. 3, the image capture device 302 may move along the trajectory 300 with the center of the field of view 304 aligned with the trajectory. That is, the image capture device 300 may be moving with the lens pointed in the direction of movement. Other types of trajectory are contemplated.

The object component 106 may be configured to obtain object information and/or other information. Obtaining object information may include one or more of accessing, acquiring, analyzing, capturing, determining, examining, generating, identifying, loading, locating, opening, receiving, retrieving, reviewing, selecting, storing, and/or otherwise obtaining the object information. The object component 106 may obtain object information from one or more locations. For example, the object component 106 may obtain object information from a storage location, such as the electronic storage 13, electronic storage of an image capture device, electronic storage of information and/or signals generated by one or more sensors, electronic storage of a device accessible via a network, and/or other locations. The object component 106 may obtain object information from one or more hardware components (e.g., a communication device) and/or one or more software components (e.g., software running on a computing device).

In some implementations, the object component 106 may obtain object information based on user interaction with a user interface/application (e.g., video editing application, video player application), and/or other information. For example, a user interface/application may provide option(s) for a user to select objects to be inserted into a video. The object information for an object may be obtained based on the user's selection of the object through the user interface/video application. Other selections of objects for retrieval of object information are contemplated.

The object information may define one or more objects to be inserted into the visual content. The object information may define object(s) to be inserted into the visual content by describing, characterizing, and/or otherwise defining the object(s) to be inserted into the visual content. For example, the object information may identify an object to be inserted into the visual content and/or include information that defines one or more content, qualities, attributes, features, and/or other aspects of the object to be inserted into the visual content.

An object may refer to an item of content to be inserted into the visual content. An object may include a static object (that does not change) or a dynamic object (that changes, such as with time). An object may include a visual representation of one or more real things and/or one or more virtual things. For example, an object may include image(s), video(s), visual(s), graphic(s), emoji(s), text(s), and/or other things. An object may include a visual representation of changes in location of things, such as trajectory of one or more things. For example, an object may include a visual representation of the trajectory of the image capture device during the capture of the video. Other types of object are contemplated.

The placement component 108 may be configured to determine placement of the object(s) within the field of view of the visual content. Determining placement of an object within the field of view of the visual content may include ascertaining, calculating, establishing, finding, identifying, setting, and/or otherwise determining the placement of the object within the field of view of the visual content. Placement of an object may be determined for different moments within the progress length of the video. The object may be placed within same part or different parts of the field of view of the visual content for different moments within the progress length of the video. The object may be placed within the field of view of the visual content for the entirety of the progress length or for one or more parts of the progress length. That is, the placement of the object may be determined so that it is visible throughout the video or is visible for one or more parts of the video.

Placement of an object within the field of view of the visual content may refer to how the object is positioned within the field of view of the visual content. Placement of an object within the field of view of the visual content may be defined by position (e.g., center location of the object), rotation (e.g., rotation about the center of the object), and size (e.g., number of pixels/angular size covered by the object) of the object within the field of view of the visual content.

The placement of the object(s) within the field of view of the visual content may be determined based on the trajectory of the image capture device during the capture of the video and/or other information. That is, the trajectory of the image capture device during the capture of the video may be used to determine where an object will be placed within the field of view of the visual content. The trajectory of the image capture device during the capture of the video may be used to determine the location of the object within the visual content.

Use of the image capture device trajectory may simplify the placement of objects within the field of view of the visual content. For example, rather than requiring the user to specify where in 3D space an object is to be placed, the trajectory of the image capture device may be used as a guide or as a limit on where the object may be placed. The trajectory of the image capture device may be used to automatically determine the placement of the object within the field of view of the visual content.

In some implementations, use of the image capture device trajectory may reduce the degree of freedom for placement of the object. For example, an object may be required to be positioned so that it is visible from a point on the trajectory of the image capture device. An object may be placed so that it is not perpendicular to the trajectory of the image capture device. For example, the object may be text, and placing the text parallel to the trajectory may cause the text to be invisible. The text may be required to be placed orthogonal to the scene that is captured within the visual content. As another example, the placement of the object may be restricted to be along the trajectory of the image capture device so that object stays on the axis of the image capture device. Other types of restriction on the placement using the trajectory of the image capture device are contemplated.

In some implementations, the placement of the object(s) may be determined to align the object(s) with a direction of gravity on the image capture device during the capture of the video. Aligning an object with the direction of gravity may result in placement of the object so that it is upright within the visual content. That is, aligning an object with the direction of gravity may result in the vertical axis of the object being aligned with the gravity. Such placement of an object may allow the object to appear upright even if the image capture device was not upright (e.g., tilted) during the capture of the video.

In some implementations, determination of the placement of the object(s) within the field of view of the visual content may include determination of relative position of the object(s) with respect to position of a virtual image capture device that represent the image capture device. The virtual image capture device may have the same characteristics (e.g., intrinsic parameters, extrinsic parameters) as the image capture device. The virtual image capture device may move along the trajectory of the image capture device, and may be used to determine how the object(s) should look when placed within the visual content. The virtual image capture device may be created from the point of view of the image capture device that captured the video. The placement of an object may be determined for a moment in the video so that the placement of the object is defined in terms of the relative position of the object with respect to the position of the virtual image capture device at that moment.

For example, referring to FIG. 3, an object 306 may be positioned using the trajectory 300. At the moment in which the object's placement is to be determined, the image capture device 302 may have been located near the beginning of the trajectory 300. A virtual image capture device may be positioned at the same place for the moment. The placement of the object 306 may be determined with respect to the position of the virtual image capture device. For example, the placement of the object 306 may be determined to be in front of and to the left of the image capture device. The placement of the object 306 may be defined in terms of how far the object 306 is from the virtual image capture device and the direction of the object from the virtual image capture device. In FIG. 3, the object 306 may be placed so that it is within the field of view (same as the field of view 304) of the virtual image capture device at the selected moment.

In some implementations, the placement of the object(s) within the field of view of the visual content may be determined based on user input. One or more graphical user interfaces may be presented for a user to provide user input. The user input may define one or more parameters to be used in determining the placement of the object(s). For example, a graphical user interface may provide options for the user to input position, rotation, and/or size of an object. The position of the object may include relative position from the trajectory of the image capture device.

For example, a graphical user interface may provide an option for a user to select a moment in the progress length of the video for insertion of an object. The graphical user interface may provide other option(s) to enable the user to specify where the object is to be placed. The placement may be determined based on the user input and the location of the image capture device on the trajectory at the selected moment. For example, the user may input a given distance that the object should be placed. The object may be placed so that it is at the given distance from the image capture device at the selected moment. The graphical user interface may provide other options on the location of the object, such as options for the user to input the orientation of the object with respect to the image capture device (e.g., whether the object should be position in front of, above, below, behind, to the side of the image capture device).

For example, referring to FIG. 3, the object 306 may be placed as shown based on (1) user selection of the moment at which the image capture device 302 was located near the beginning of the trajectory 300, (2) user selection of the object 306, and (3) user input to position the object 306 in front of and to the left. The object 306 may be positioned as shown in FIG. 3 so that it will be visible (within the field of view of the visual content) at the selected moment.

Such placement of objects may be simpler and less costly (e.g., less computing power, less time consuming) than use of 3D scenes to place objects. Rather than computing and rendering a complex 3D scene for a user to utilize in placing objects, the location(s) of the image capture device along the trajectory may be used to compute the placement of the object. For example, to place the object 306 at the location shown in FIG. 3, a user may need to only select (1) a moment in the progress length of the video for use in placing the object, such as by viewing the video and selecting a desired time point in the video, and (2) the object to be inserted into the video. The object may be placed so that it is visible (within the field of view 304) at that moment using the trajectory 300 of the image capture device 302. The user may provide other inputs to control the placement of the object, such as the size of the object and the relative positioning of the object from the image capture device.

The modification component 110 may be configured to modify the visual content. Modifying the visual content may include changing existing visual content, generating new visual content from existing visual content, and/or otherwise modifying the visual content. The visual content may be modified by inserting the object(s) into the visual content. The visual content may be modified to include the object(s) based on the placement of the object(s) within the field of view of the visual content and/or other information. The visual content may be modified to include the object(s) at the same part or different parts of the field of view of the visual content for different moments within the progress length of the video. The visual content may be modified to include the object(s) through the entirety of the progress length or for one or more parts of the progress length. In some implementations, the objects may be placed within one layer, and the visual content may be placed in another layer, and the layers may be blended to modify the visual content.

In some implementations, the placement of the object(s) within the field of view of the visual content may determine distortion that is applied to the object(s) for inclusion in the visual content. An object may be inserted into the visual content from a virtual image capture device point of view, with the object distorted to simulate how the object would look if the object had been captured by the image capture device. The distortion may be applied to the object based on the placement of the object within the field of view of the visual content, intrinsic parameters of the image capture device (e.g., lens distortion, field of view, focal length, shutter speed, pixel locations), and/or other information. The relative location of the object with respect to the virtual image capture device and the intrinsic parameters of the image capture device may be used to determine projection of the object to the virtual image capture device. The visual content may be modified to include other visual effects, such as motion blur simulation, rolling shutter simulation, and/or fade-in/out of the object.

For example, referring to FIG. 3, the object 306 may be inserted into the visual content so that when the virtual image capture device is positioned at the location of the image capture device 302, the object 306 is presented on the left side of the modified visual content. When the object 306 may disappear from view when the virtual image capture device moves past the object 306, and reappear when the object 306 is again within the field of view of the virtual image capture device. For example, after the virtual image capture device goes around the loop in the trajectory 300, the object 306 enter the field of view from the right side, and the object 306 may be presented on the right side of the modified visual content. Thus, in FIG. 3, the visual content may be modified to present the object 306 from different points of view.

While the placement of the object 306 shown in FIG. 3 is static, this is merely as an example and is not meant to be limited. In some implementations, the placement of the object may change over the progress length of the video.

In some implementations, the visual content may be modified to include the object(s) over existing visual content. The object(s) may be inserted into the visual content so that it replaces the existing visual content. 3D scene of the view captured by the image capture device may not be needed for such modification of the visual content. Rather, such modification may utilize the trajectory of the image capture device as described above. In some implementations, the visual content being modified to include an object over existing visual content may preserve some of the existing visual content. For example, transparency may be applied to the inserted object so that existing visual content is visible through the object.

In some implementations, the visual content may be modified to include existing visual content over at least a portion of the object(s). The visual content may be modified so that existing visual content occludes one or more portions of the object(s). Such modification of the visual content may require 3D scene of the view captured by the image capture device. For example, Structure from Motion may be used on the visual content to generate points (e.g., sparse points, point cloud) that represent things that were in the view captured by the image capture device, and the points may be used to determine which parts of the visual content should occlude which parts of the object based on the placement of the object, the location of the points, and the location of the virtual image capture device.

Figure 4:
FIG. 4 illustrates example images into which an object has been inserted.
Figure 4:
Figure 4:
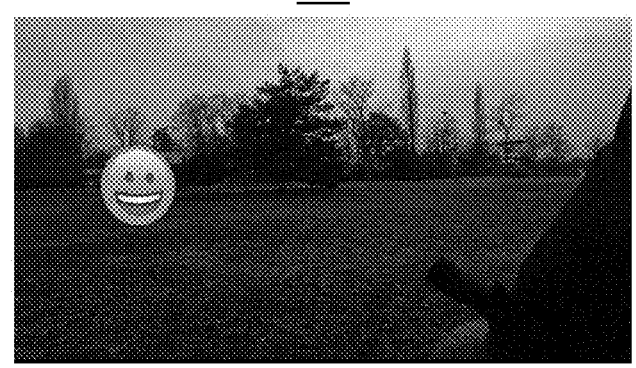

FIG. 4 illustrates example images 402, 404, 406 into which an object has been inserted. The object that is inserted into the images 402, 404, 406 may include a spinning smiley face. The smiley face may be inserted in the left side of the image 402 based on the smiley face being placed in the front and to the left of the virtual image capture device. The trajectory of the image capture device may take the virtual image capture device closer to the location at which the smiley face was placed. As the virtual image capture device moves closer to this location, the smiley face may grow larger, as shown in the image 404. The trajectory may swerve left and cause the smiley face to move closer to the center of the image 406.

Figure 5:
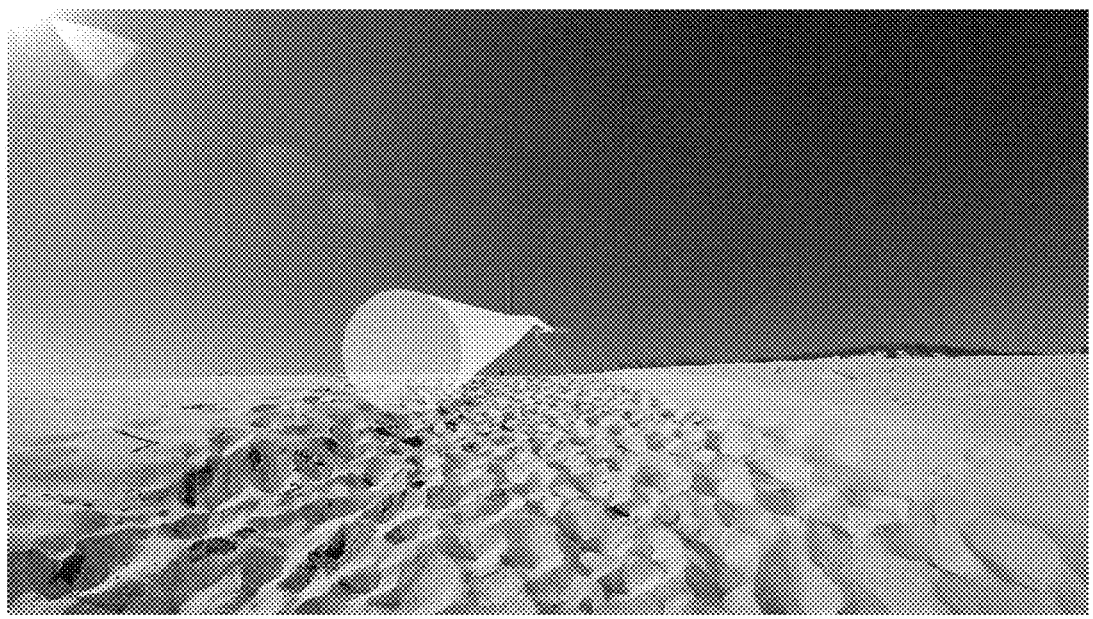
FIG. 5 illustrates an example image into which an object representing the trajectory of an image capture device has been inserted.

FIG. 5 illustrates an example image 500 into which an object has been inserted. The object that is inserted into the image 500 may include a visual representation of the trajectory of the image capture device. For example, in the image 500, a transparent tube may represent the trajectory of the image capture device. The transparent tube may be laid over the trajectory. Such modification of the visual content may allow a user to see locations of the image capture devices at different moments within the capture duration.

Modified visual content may be generated as an encoded version/copy of the modified video (e.g., encoded video file) and/or as instructions for presenting the modified visual content. For example, the modified visual content may be generated as an encoded video in a video file, and the video file may be opened in a video player for presentation on one or more displays. The modified visual content may be generated as instructions identifying the placement of the object(s) within the field of view of the visual content, and a video player may use the instructions to insert the object(s) into the visual content for presentation.

The modification component 110 may be configured effectuate storage of the modified visual content and/or other information in one or more storage media. For example, the modified visual content (e.g., video file, instructions) may be stored in the electronic storage 13, remote storage locations (storage media located at/accessible through a server), and/or other locations. In some implementations, the modification component 110 may effectuate storage of the modified visual content through one or more intermediary devices. For example, the processor 11 may be located within a computing device without a connection to the storage device (e.g., the computing device lacks WiFi/cellular connection to the storage device). The modification component 110 may effectuate storage of the modified visual content through another device that has the necessary connection (e.g., the computing device using a WiFi/cellular connection of a paired mobile device, such as a smartphone, tablet, laptop, to store information in one or more storage media). Other storage locations for and storage of the modified visual content are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
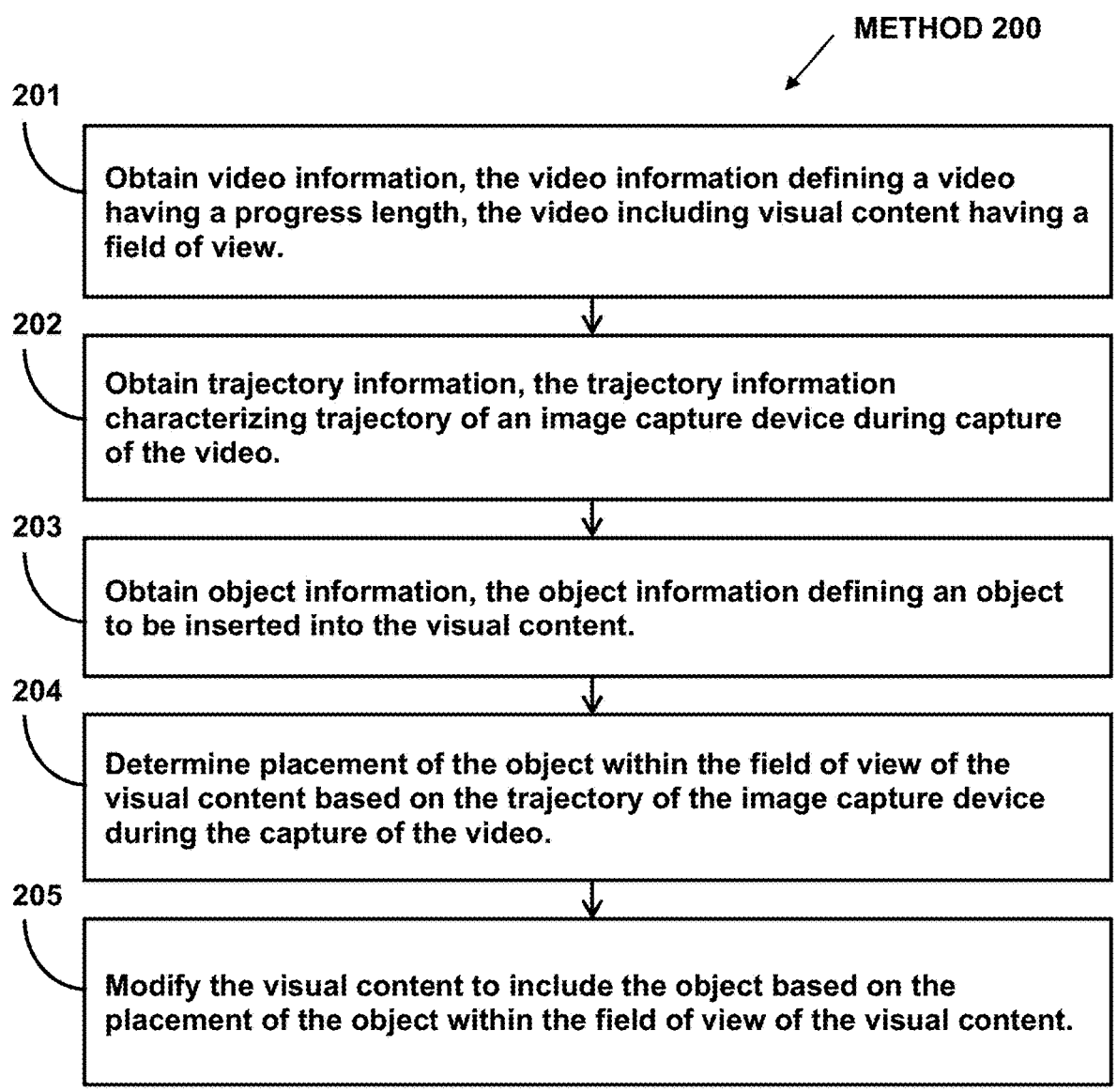
FIG. 2 illustrates an example method for inserting content into videos.

FIG. 2 illustrates method 200 for inserting content into videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video having a progress length. The video may include visual content having a field of view. In some implementations, operation 201 may be performed by a processor component the same as or similar to the video component 102 (Shown in FIG. 1 and described herein).

At operation 202, trajectory information may be obtained. The trajectory information may characterize trajectory of an image capture device during capture of the video. In some implementations, operation 202 may be performed by a processor component the same as or similar to the trajectory component 104 (Shown in FIG. 1 and described herein).

At operation 203, object information may be obtained. The object information may define an object to be inserted into the visual content. In some implementations, operation 203 may be performed by a processor component the same as or similar to the object component 106 (Shown in FIG. 1 and described herein).

At operation 204, placement of the object within the field of view of the visual content may be determined based on the trajectory of the image capture device during the capture of the video and/or other information. In some implementations, operation 204 may be performed by a processor component the same as or similar to the placement component 108 (Shown in FIG. 1 and described herein).

At operation 205, the visual content may be modified to include the object based on the placement of the object within the field of view of the visual content and/or other information. In some implementations, operation 205 may be performed by a processor component the same as or similar to the modification component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for inserting content into videos, the system comprising:
    one or more physical processors configured by machine-readable instructions to:
        obtain video information, the video information defining a video having a progress length, the video including visual content having a field of view;
        obtain trajectory information, the trajectory information characterizing trajectory of an image capture device during capture of the video, the trajectory of the image capture device during the capture of the video including translational position and rotational position of the image capture device during the capture of the video;
        obtain object information, the object information defining an object to be inserted into the visual content;
        determine placement of the object within the field of view of the visual content based on the trajectory of the image capture device during the capture of the video, wherein the trajectory of the image capture device during the capture of the video restricts the placement of the object within the field of view of the visual content to require the placement of the object be defined relative to a point on the trajectory of the image capture device rather than in 3D space, the point on the trajectory of the image capture device respect to which the placement of the object is defined including a position of a virtual image capture device, further wherein the placement of the object within the field of view of the visual content is determined without computation of 3D scenes of views captured by the image capture device; and
        modify the visual content to include the object based on the placement of the object defined relative to the point on the trajectory of the image capture device.

2. The system of claim 1, wherein:
    the placement of the object within the field of view of the visual content is determined to align the object with a direction of gravity on the image capture device during the capture of the video; and
    the placement of the object within the field of view of the visual content determines distortion that is applied to the object for inclusion in the visual content.

3. A system for inserting content into videos, the system comprising:
    one or more physical processors configured by machine-readable instructions to:
        obtain video information, the video information defining a video having a progress length, the video including visual content having a field of view;
        obtain trajectory information, the trajectory information characterizing trajectory of an image capture device during capture of the video;
        obtain object information, the object information defining an object to be inserted into the visual content;
        determine placement of the object within the field of view of the visual content based on the trajectory of the image capture device during the capture of the video, wherein the trajectory of the image capture device during the capture of the video restricts the placement of the object within the field of view of the visual content to require the placement of the object be defined relative to a point on the trajectory of the image capture device rather than in 3D space, further wherein the placement of the object within the field of view of the visual content is determined without computation of 3D scenes of views captured by the image capture device; and
        modify the visual content to include the object based on the placement of the object defined relative to the point on the trajectory of the image capture device.

4. The system of claim 3, wherein the trajectory of the image capture device during the capture of the video includes translational position and rotational position of the image capture device during the capture of the video.

5. The system of claim 3, wherein the point on the trajectory of the image capture device respect to which the placement of the object is defined includes a position of a virtual image capture device.

6. The system of claim 3, wherein the trajectory of the image capture device further restricts the placement of the object within the field of view of the visual content to restrict the object from placed perpendicular to the trajectory of the image capture device.

7. The system of claim 3, wherein the placement of the object is determined to align the object with a direction of gravity on the image capture device during the capture of the video.

8. The system of claim 3, wherein the placement of the object within the field of view of the visual content determines distortion that is applied to the object for inclusion in the visual content.

9. The system of claim 3, wherein the visual content is modified to include the object over existing visual content.

10. The system of claim 3, wherein the trajectory of the image capture device further restricts the placement of the object within the field of view of the visual content to require the object be positioned along the trajectory of the image capture device.

11. The system of claim 3, wherein the object includes a visual representation of the trajectory of the image capture device during the capture of the video, and modification of the visual content to include the visual representation of the trajectory of the image capture device during the capture of the video results in the modified visual content providing a view of locations of the image capture device at different moments during the capture of the video.

12. A method for inserting content into videos, the method performed by a computing system including one or more processors, the method comprising:
obtaining, by the computing system, video information, the video information defining a video having a progress length, the video including visual content having a field of view;
obtaining, by the computing system, trajectory information, the trajectory information characterizing trajectory of an image capture device during capture of the video;
obtaining, by the computing system, object information, the object information defining an object to be inserted into the visual content;
determining, by the computing system, placement of the object within the field of view of the visual content based on the trajectory of the image capture device during the capture of the video, wherein the trajectory of the image capture device during the capture of the video restricts the placement of the object within the field of view of the visual content to require the placement of the object be defined relative to a point on the trajectory of the image capture device rather than in 3D space, further wherein the placement of the object within the field of view of the visual content is determined without computation of 3D scenes of views captured by the image capture device; and
modifying, by the computing system, the visual content to include the object based on the placement of the object defined relative to the point on the trajectory of the image capture device.

13. The method of claim 12, wherein the trajectory of the image capture device during the capture of the video includes translational position and rotational position of the image capture device during the capture of the video.

14. The method of claim 12, wherein the point on the trajectory of the image capture device respect to which the placement of the object is defined includes a position of a virtual image capture device.

15. The method of claim 12, wherein the trajectory of the image capture device further restricts the placement of the object within the field of view of the visual content to restrict the object from placed perpendicular to the trajectory of the image capture device.

16. The method of claim 12, wherein the placement of the object is determined to align the object with a direction of gravity on the image capture device during the capture of the video.

17. The method of claim 12, wherein the placement of the object within the field of view of the visual content determines distortion that is applied to the object for inclusion in the visual content.

18. The method of claim 12, wherein the visual content is modified to include the object over existing visual content.

19. The method of claim 12, wherein the trajectory of the image capture device further restricts the placement of the object within the field of view of the visual content to require the object be positioned along the trajectory of the image capture device.

20. The method of claim 12, wherein the object includes a visual representation of the trajectory of the image capture device during the capture of the video, and modification of the visual content to include the visual representation of the trajectory of the image capture device during the capture of the video results in the modified visual content providing a view of locations of the image capture device at different moments during the capture of the video.

* * * * *